(No Model.)
G. B. RANSOM.
Milk Can.
No. 239,191. Patented March 22, 1881.
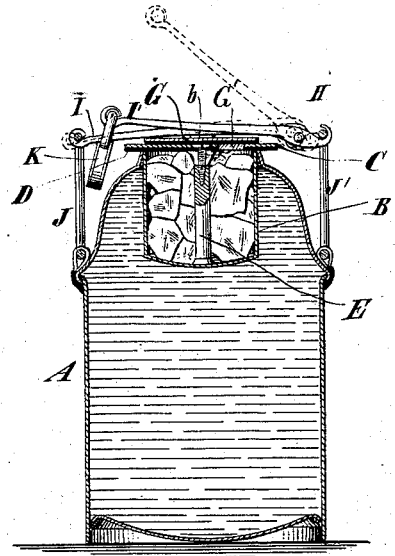
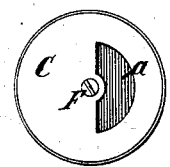
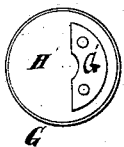
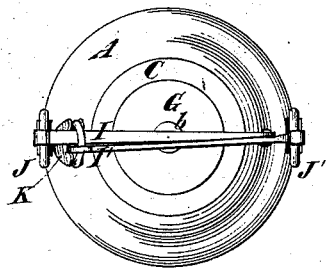
Witnesses:-
Louis M. Whitehead.
W. Keane.
Inventor:
George B. Ransom
By his Attorney
Brown + Brown

UNITED STATES PATENT OFFICE.

GEORGE B. RANSOM, OF SMITHTOWN BRANCH, ASSIGNOR OF ONE-HALF TO ALEXANDER CAMPBELL, OF BROOKLYN, NEW YORK.

MILK-CAN.

SPECIFICATION forming part of Letters Patent No. 239,191, dated March 22, 1881.

Application filed November 4, 1880. (No model.)

*To all whom it may concern:*

Be it known that I, GEORGE B. RANSOM, of Smithtown Branch, in the county of Suffolk and State of New York, have invented certain new and useful Improvements in Milk-Cans, of which the following is a specification.

My invention consists in a cover for a can composed of a body having an upturned rim, a detachable top plate, a packing inserted between said body and top plate, and a screw and nut for retaining them together, whereby the edge of the rim of said body is made to indent itself into said packing, and thus form a tight joint between said body and top plate.

It also consists in the combination, with a can, of a cover composed of a body and a top plate extending beyond said body, a screw and nut for securing said body and top plate together, and a packing inserted between said body and top plate, and extending beyond said body and resting upon the top of the can, whereby a tight joint is formed between the can and cover by the edge of the can indenting itself into the packing.

It also consists in the combination, with a can, a cover therefor, and a removable lid for said cover, of compound levers whereby the cover is secured to the can and the lid to the opening in the cover.

In the accompanying drawings, Figure 1 is a central vertical section of a milk-can and cover embodying my invention. Fig. 2 is a plan of the same. Fig. 3 is a plan of the cover with its lid removed. Fig. 4 is an inverted view of the lid, and Fig. 5 is a central vertical section of a cover of another form.

Similar letters of reference designate corresponding parts in all the figures.

A designates the body of the can, which may be of the usual or any suitable form and make.

B C designate the cover of the can, consisting of a body, B, of cylindric, conical, convex, or other suitable form, made of sheet metal or other appropriate material, and having an upturned rim and a top plate, C, of similar material, having its edges projecting beyond the body B and forming the flange of the cover.

D designates a packing, consisting of a sheet of india-rubber or like material, shown as of a size and shape corresponding to the top plate, C, of the cover, and inserted between it and the body B of the cover.

E designates a nut or internally screw-threaded post, secured by solder or otherwise to the body B of the cover; and F designates a screw passing through the top plate, B, of the cover and entering the nut E, thereby securing the body and top plate of the cover together, and causing the edge of the rim of the body to indent itself into the packing D, and thereby form a tight joint between said body and top plate.

In the cover shown in Figs. 1, 2, 3, and 4 the body B is made of a considerable depth, so as to form a receptacle for ice, whereby the contents of the can may be kept cool, and the top plate, C, is provided with an opening, *a*, through which the ice may be inserted, and a removable lid, G, consisting of a disk of metal, provided on the under side with a projection, G', of a size and shape to fit snugly in the opening *a*. Between this disk and the projection, or otherwise secured to the lid G, is a packing consisting of a sheet of india-rubber or other suitable material, H, for making a tight joint between the said lid and the opening *a* in the top plate, C, of the cover B C.

Where the body of the can-cover serves as an ice-receptacle it is made to extend below the neck of the can and into the body and contents thereof, and it has no communication with the can, so that there is no danger of the milk becoming diluted by the melted ice.

In the cover shown in Fig. 5 the body is smaller, and is not designed for an ice-receptacle. The former is designed especially for summer weather. Either may be used in winter. In each case the body B of the cover fits snugly in the mouth and neck of the can, and serves, in being inserted therein, to displace air from the can and to occupy all space not filled with milk, so that the milk cannot move about in the can. The packing D serves to make a tight joint between the body B and top plate, C, of the cover, and also between the cover and body of the can, the edges of the body of the cover and of the mouth of the can indenting themselves into it.

I I' designate compound levers, one of which, I, is fastened to a bail or loop, J, secured to one side of the can-body A, and extends across the top of the cover B C, and, where the lid G is used, across it also, thereby retaining the same in place. To this lever I, near its free end, is pivoted another lever, I', provided at the outer end with a hook engaging with a bail or loop, J', secured to the body A of the can, and with an eye at the inner end, whereby, through the agency of a padlock, K, or otherwise, it may be secured to the lever I. The lever I is extended across the cover B C. The lever I' is raised into an upright position, as shown in dotted outline in Fig. 1, to facilitate the engagement of its hook with the bail or loop J', and thereafter the lever I' is brought down approximately parallel with the lever I, and secured, as above explained. By this means the cover B C may with ease be forcibly inserted into the mouth of the can and forcibly held there. On releasing the lever I' and raising it into an upright position its hook may be easily disengaged from the bail or loop J'.

The lever I may be provided with a foot, b, where it bears on the cover B C or lid G, and the lever I' will then rest on this foot instead of on the said cover or lid.

It will be understood that the lever I constitutes the means for holding the can-cover to the can, while the lever I' constitutes the means for locking the lever I in place.

What I claim as my invention, and desire to secure by Letters Patent, is—

1. A cover for a milk-can, composed of a body having an upturned rim, a detachable top plate, a packing inserted between said top plate and the edge of the rim of said body, and a screw and nut for securing them together, whereby the edge of said rim is caused to indent itself into said packing, substantially as and for the purpose specified.

2. The combination, with a can, of a cover composed of a body and a top plate extending beyond said body, a screw and nut for securing said top plate and body together, and a packing inserted between said top plate and body, and extending beyond said body and resting upon the top of the can, whereby a tight joint is formed between said can and cover by the can indenting itself into said packing, substantially as specified.

3. The combination of a can, a cover therefor, the compound levers I I', means for connecting said levers with the can-body, and means for securing the lever I' to the lever I, substantially as specified.

4. The combination of a can, a cover therefor provided with an opening and a removable lid, the levers I I', means for connecting said levers with the can-body, and means for securing the lever I' to the lever I, substantially as specified.

GEORGE B. RANSOM.

Witnesses:
JACOB B. CONKLIN,
WALTER L. DARLING.